US006800965B1

(12) United States Patent
Turner et al.

(10) Patent No.: US 6,800,965 B1
(45) Date of Patent: Oct. 5, 2004

(54) SWITCH INPUT CURRENT CIRCUIT

(75) Inventors: Scott Haydon Turner, Somerville (AU); Matthew David Fenwick, Glen Waverley (AU)

(73) Assignee: Robert Bosch GmbH, Stuttgart (DE)

( * ) Notice: Subject to any disclaimer, the term of this patent is extended or adjusted under 35 U.S.C. 154(b) by 10 days.

(21) Appl. No.: 10/169,622

(22) PCT Filed: Nov. 28, 2000

(86) PCT No.: PCT/DE00/04230

§ 371 (c)(1), (2), (4) Date: Oct. 4, 2002

(87) PCT Pub. No.: WO01/43151

PCT Pub. Date: Jun. 14, 2001

(30) Foreign Application Priority Data

Dec. 10, 1999 (AU) .......................................... 64452/99

(51) Int. Cl.[7] .............................................. H02B 1/24
(52) U.S. Cl. ..................................................... 307/128
(58) Field of Search ......................................... 307/128

(56) References Cited

U.S. PATENT DOCUMENTS 5,170,970 A * 12/1992 Ballinger .................. 246/34 R
5,621,250 A * 4/1997 Kim .......................... 307/10.1

FOREIGN PATENT DOCUMENTS

| | | |
|---|---|---|
| DE | 195 36 196 | 12/1996 |
| EP | 0 101 643 | 2/1984 |
| JP | 11 066994 | 3/1999 |

* cited by examiner

*Primary Examiner*—Pia Tibbits
(74) *Attorney, Agent, or Firm*—Kenyon & Kenyon

(57) ABSTRACT

A method and corresponding apparatus for improving the power consumption of a switch input circuit is described having resistive elements, the method including the steps of providing a wetting current to at least one switch through a respective resistive element, and modulating the wetting current with a pulse width modulation signal to provide a reduced average voltage applied to the respective resistive element, and thereby reduce the power consumption of the circuit.

18 Claims, 3 Drawing Sheets

SWITCH INPUT CURRENT CIRCUIT

FIELD OF THE INVENTION

The present invention relates to switch input circuits. In particular, the present invention relates to a switch input circuit having a power-saving device, for example during an application of a wetting current to the switch or switches.

BACKGROUND INFORMATION

Automotive switching systems that are connected to electronic control units may require a certain current flow when the switch contacts are closed, in order to 'clean' the contacts of any oxidation or other contaminants. This current may be referred to as the wetting current, and may be defined with reference to a,particular voltage, for example >10 mA at 12 volts.

An approach may be to simply provide a pull-up or pull-down resistor associated with the input processing circuitry in the control unit. This pull-up resistor may be driven by a transistor so that the wetting current may be switched on or off by a control signal connected to the base of the transistor, thereby reducing quiescent current flow.

When the switch contacts are closed, power may be dissipated by the pull-up resistor in the form of heat. Therefore, a suitable resistor may be required to be chosen which may dissipate this heat under the worst case conditions, for example at maximum battery voltage and maximum operating temperature. Depending on the application, for example if the circuit is located in a confined space and there are many switch inputs, the heat generated may cause problems with other electrical components. The problems with power dissipation may become even worse in truck systems having 24 volt batteries, because power may be proportional to voltage.

However, it may also be desirable to keep the wetting current at a relatively high level over the contact cleaning period, in order to effectively clean the switch or switches.

For example: for a 24 volt supply for a truck switch input circuit, a resistor of 1800 Ohms may be required to provide 10 mA at 18V, and may dissipate 320 mW at 24 volts. At the maximum 32 volts, this resistor may dissipate 570 mW.

SUMMARY OF THE INVENTION

The present invention may provide an exemplary method of providing a wetting current to at least one switch through a respective resistor, characterized by modulating the wetting current to reduce average power consumption of the respective resistive element.

The pulse width modulation signal may be supplied to the base of a transistor to periodically allow the wetting current to flow through the emitter and collector of the transistor into the switch input circuit, in accordance with the duty cycle of the pulse width modulation signal.

The method may further include the step of sensing the number of closed switches connected to the switch input circuit. The method may further include the step of providing adjustment of the pulse width modulation signal in response to the sensed number of closed switches. The step of providing adjustment may include increasing the duty cycle of the pulse width modulation signal, if the sensed number of closed switches increases.

The method may further include the step of determining the voltage level of a voltage supply of the circuit. The step of determining may include sensing the voltage level using an analog-to-digital converter to thereby determine a digital value representative of the voltage level. The method may further include the steps of: determining, from the digital value, which of a plurality of predetermined voltage ranges the voltage level of the voltage supply falls within; and adjusting the duty cycle of the pulse width modulation signal depending on the relevant voltage range of the voltage supply.

The present invention may further provide a switch input circuit having a current source for providing the wetting current to at least one switch through a respective resistive element, characterized by a modulation arrangement for modulating the wetting current to provide a reduced average power consumption of the respective resistive element.

The present invention may further provide a switch input circuit having improved power consumption characteristics, the circuit including a current source for supplying a wetting current to at least one switch, and a pulse width modulation signal for modulating the supply of the wetting current to the at least one switch to thereby reduce the average wetting current thus supplied.

The present invention may further provide a method of improving power consumption characteristics of a switch input circuit, including the steps of: providing a wetting current to at least one switch; modulating the wetting current with a pulse width modulation signal to reduce the average wetting current provided to the at least one switch.

Exemplary embodiments of the present invention may be implemented without additional hardware, provided that the filter capacitors used on the inputs are sufficient to ensure electromagnetic compatibility (EMC), and that the microcontroller delivers the appropriate pulse width modulation (PWM) signal.

DETAILED DESCRIPTION

DETAILED DESCRIPTION

Figure 1:
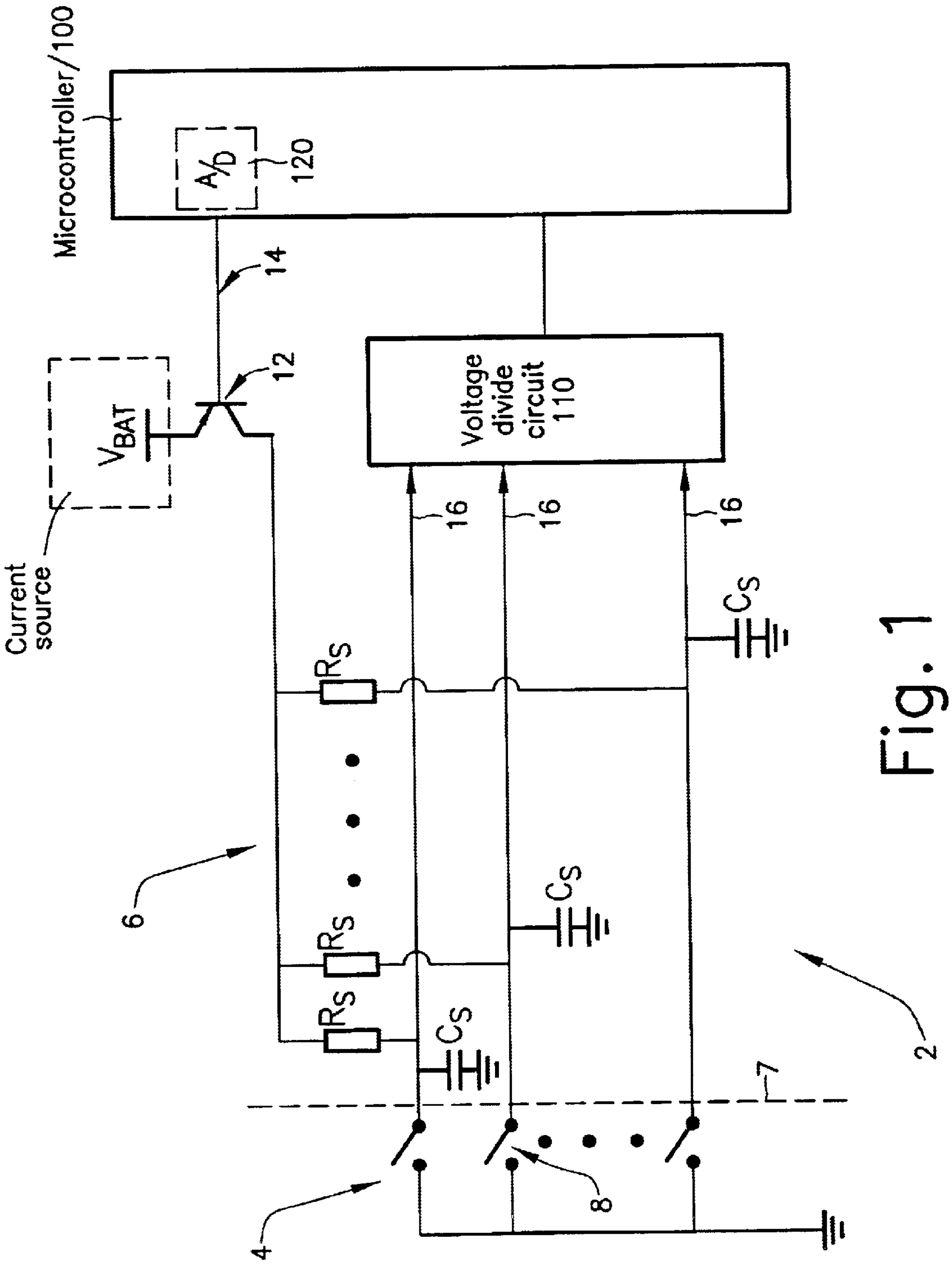
FIG. 1 shows a switch input circuit.
Figure 2:
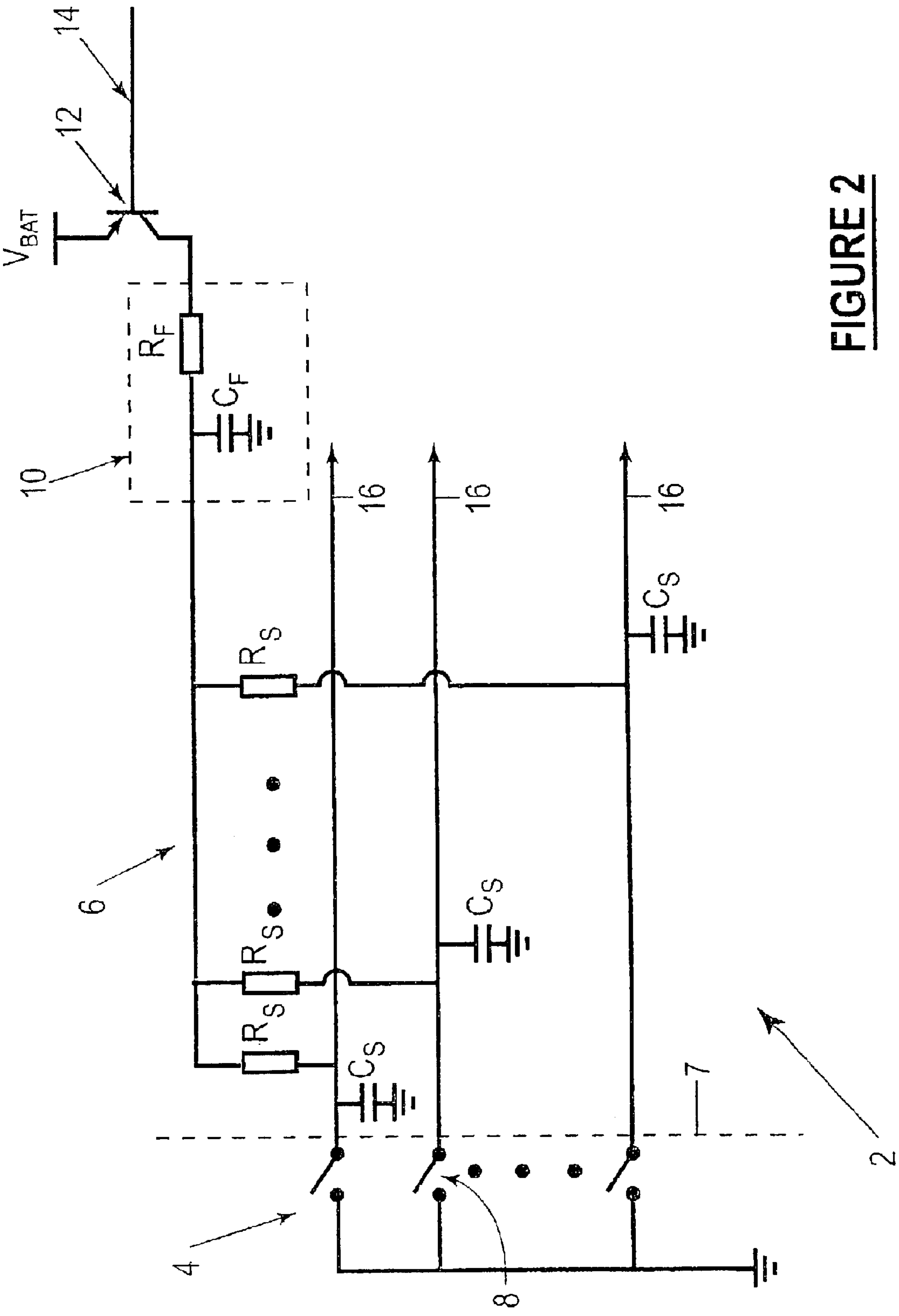
FIG. 2 shows a switch input circuit having an added R-C circuit.

FIGS. 1 and 2 show a switching system 2, which includes a switching circuit 4 having a number of parallel switches 8 and a switch input circuit 6. Switch input circuit 6 includes a number lines 16 corresponding to the number of switches, each line being connected through a series resistor $R_S$ to a voltage supply $V_{BAT}$ through a transistor 12. Optionally, a grounded capacitor $C_S$ may also be connected to each line 16, if required for EMC.

A control line 14 is connected to the base of transistor 12 to control the current flowing through it. By increasing the voltage of control line 14, transistor 12 may be shut off, and by decreasing the voltage of control line 14, transistor 12 may be turned on. Therefore, if an alternating signal such as a PWM signal is applied to control line 14, the current supply to switching circuit 4 may be periodically turned on and off.

By using PWM control of the wetting current, the size and cost of switch input circuit 6 may be reduced, as well as the power dissipation of pull-up resistor $R_S$. Essentially, the PWM signal produces an input signal to switching circuit 4 having an average voltage, which is less than the battery voltage and therefore may consume less power (as power is directly proportional to voltage). Thus, while the transistor is turned on, the peak current is greater than the normal wetting current, but the average value of the wetting current over time is the correct wetting current.

Switch input circuit 6 may include a simple R-C filtering circuit, as shown in FIG. 2, to reduce potential electromagnetic interference (EMI) which may otherwise be generated by switch input circuit 6.

Figure 3:
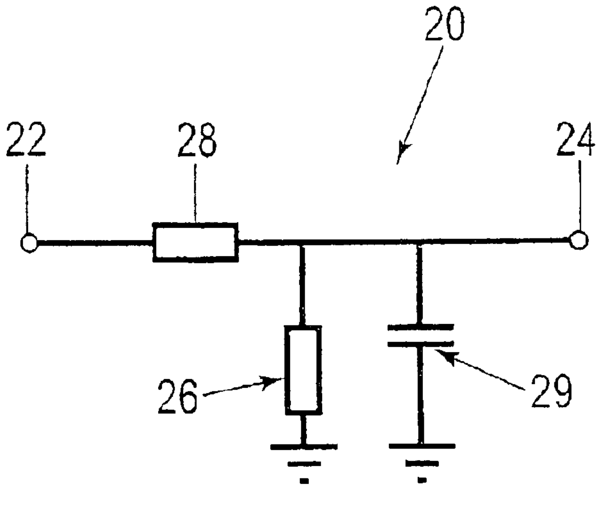
FIG. 3 shows a normal voltage divider circuit used in the switch input circuit.
Figure 4:
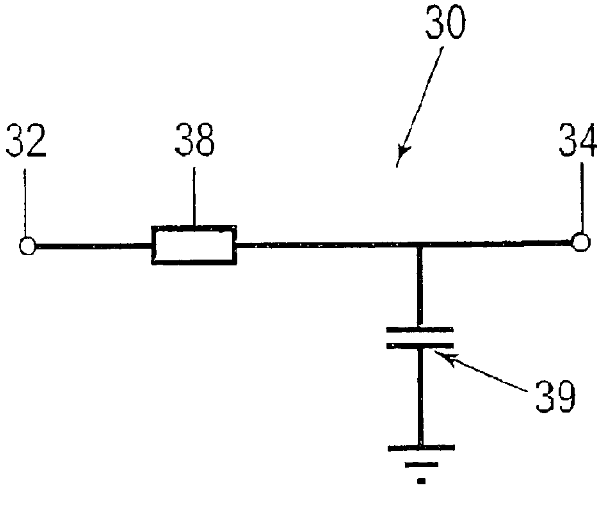
FIG. 4 shows the voltage divider circuit of FIG. 3 with the pull-down resistor removed.

Switch input circuit 6 includes a microcontroller 100 for applying the PWM signal to control line 14 and for receiving input from each of lines 16 via a voltage divider circuit 110 as shown in either of FIGS. 3 or 4. The microcontroller may have suitable outputs and inputs to connect to lines 14 and 16, respectively. The microcontroller may be of an available programmable type which may produce a PWM signal of different duty cycles. The inputs from lines 16 may be used by the microcontroller as feedback control in determining the appropriate PWM duty cycle to provide the necessary wetting current to switching circuit 4.

In R-C filtering circuit 10, resistor $R_F$ dissipates some power and reduces the wetting current. The value may be chosen according to each application of the invention so as not to dissipate too much power with all switches on. To compensate for the reduction in wetting current, which may decrease with an increased number of switches, the microcontroller senses the number of active (closed) switches and adjusts the PWM duty cycle accordingly. If the number of active switches increases, the PWM duty cycle may be increased by the microcontroller. Conversely, it the number of active switches decreases, the PWM duty cycle may be decreased by the microcontroller.

The duty cycle of the PWM signal may also be adjusted in response to changes in battery voltage to further limit power dissipation. The microprocessor may react to the sensed battery voltage in several limited ranges, effectively providing open loop control over the PWM signal. The microcontroller used here may be an analog-to-digital convertor to enable simple sensing of the analog voltage level in terms of an 8-bit value (for example). For the 24 volt example described previously, by using PWM control at 32 volts, the power dissipated through the resistor may be limited to approximately 220 mW. If the microprocessor also senses battery voltage ranges (e.g. range 1: 18–25V, range 2: 25–32V), then, in the higher range, a lower PWM duty cycle is used to decrease the amount of power dissipated (to approximately 110 mW if the voltage range is 25–32 V). Further calculations and details are provided below.

Alternatively, closed loop feedback control may be used to continually modify the PWM duty cycle in response to the measured battery voltage, but this may involve greater computational load on the microprocessor.

By providing PWM modulation of the wetting current, a resistor may be saved from the normal voltage divider circuit (shown in FIG. 3) and used to convert the voltage at the switch to voltages that the microcontroller may sample. Because the average applied voltage is less, the pull-down resistor in the divider may be saved, and only the series resistor may be required to be retained for current limiting purposes.

A microcontroller with 0–5 volt inputs may be arranged to have inputs from a 24 volt system reduced by using a voltage divider (e.g. 100K and 33K resistors). If the average voltage is sufficiently reduced by PWM, then the 33 k pull-down resistor may be removed, leaving only the 100 k series resistor.

The switch input circuit may be implemented with no additional hardware. However a further option may include using a simple R-C low pass filter if required for EMC reasons. A microcontroller with built-in PWM outputs may be provided, but this may be achieved using a normal microcontroller output port. For additional power reduction, the microcontroller also may require some arrangement of sensing the battery voltage, if not continuously (for example, by using an analog-to-digital converter), then at least to sense two different voltage supply ranges.

A suitable microcontroller may be the Motorola MC68HC08AZ32. This unit may be an 8-bit controller which includes an 8-bit analog-to-digital converter (e.g., A/D 120) and a software programmable PWM output having a variable duty cycle and variable frequency.

The control software of the microcontroller may use a fixed PWM output to reduce the average voltage or, if using R-C filter 10, may be required to determine the PWM duty cycle to use as a function of the number of switches pressed. In addition, the PWM duty cycle may be adjusted as a function of the battery voltage.

The following description applies only to the latter two cases (R-C filter and battery voltage sensing).

The microcontroller may be arranged to monitor the switches in a traditional manner, but may be required to note the sampling point of the signal. The switch input may only be sampled while the wetting current is applied. Extending this further for optimum performance may involve sampling just before the wetting current is switched off (to ensure maximum wetting action), but the sampling may be done some other time during the pulse, in which case time constants in the switch circuit from R-C filtering effects may be required to be considered. A procedure of the microcontroller (operating as a cyclic task) determines the number of switches currently pressed and dynamically adjusts the PWM duty cycle in accordance with look-up tables. If the battery-voltage sensing feature is used, then the function may change to a different look-up table, or alternatively apply a transfer function to modify the existing look-up table.

When a switch is initially pressed, there may be a higher current for a short time before the PWM adjusts. This time may include the debounce and filtering times for the switches and battery voltage, to prevent noise and transients from causing undesirable adjustments to the PWM duty cycle. Even if this reaction time were as much as 100 ms, the power peak experienced may not cause any problems, as the resistors used may be able to withstand short peaks.

The frequencies of PWM operation may be chosen after considering several factors such as generated EMI, such as, for example, in the audio range (e.g. if applicable, may be chosen in conjunction with EMI filter circuit). The switching losses in the drive transistor at high frequencies may also be required to be considered.

For determining the frequency of the PWM signal [Freq=1/($T_{ON}$+$T_{OFF}$)], the following factors may be required to be considered:

The frequency is large enough so that instantaneous current $I_{INST}$ (which is larger that the average current), does not adversely affect system components (pull-up resistor, driver transistor, switch contacts). At a very low frequency (i.e. a longer ON cycle), the power dissipated in these components during the ON cycle may exceed their maximum ratings before the OFF time allows them to recover or cool down. The frequency may be typically greater than 100 Hz to satisfy this requirement.

The frequency should not be in the audio range (20 Hz–20 kHz), otherwise radiated or conducted EMI may interfere with other components such as car radios (with perceivable noise in the speakers).

The frequency should be less than the transition frequency of the driver transistor, as above this frequency, the transistor rapidly loses gain and may not work at all. This may be in the order of 1MHz for general purpose transistors.

If an R-C filter is specifically chosen to reduce generated EMI, then the frequency may be required to be chosen in conjunction with the time constant of the R-C filter. A typical example may be to set the PWM frequency to 250 KHz, and set the time constant of the R-C filter to 10 μsec (F=100 KHz), so that the R-C filter may smooth the rise and fall times of the output to reduce EMI.

The following formulas may be derived from Ohm's laws (V=IR, P=IV). The symbols used are as follows:

| | |
|---|---|
| $V_{BAT}$ | Reference battery voltage for desired wetting current |
| $I_{WET}$ | Desired wetting current for each switch |
| $I_{TOT}$ | Total current through $R_F$ with no PWM |
| $I_{SW}$ | Individual switch current with no PWM |
| $R_F$ | Filter resistor |
| $R_S$ | Switch pull-up resistor |
| NUM | Number of active switches (contacts closed) |
| $T_{ON}$ | Time period of the ON pulse of the PWM signal |
| $T_{OFF}$ | Time period of the PWM signal for which there is no pulse |
| Duty | Duty cycle in percentage; Duty = $T_{ON}/(T_{ON} + T_{OFF})$ |

Furthermore, the average current $I_{AVG}$ through a switch may be equivalent to wetting current $I_{WET}$ and may be related to instantaneous current $I_{INST}$ by $I_{WET}=I_{AVG}=I_{INST}\times$ Duty.

The current and individual current with no PWM control:

$$\text{Total current: } I_{TOT}=V_{BAT}/R_P+R_S/NUM) \quad (1)$$

$$\text{Switch current: } I_{SW}=I_{TOT}/NUM=V_{BAT}/(R_F\times NUM+R_S) \quad (2)$$

Now the PWM duty cycle may be required to be chosen to reduce the average current through each switch to the desired level ($I_{WET}$).

$$\text{Duty cycle: Duty (100\%)}=100\times I_{WET}\times NUM/I_{TOT} \quad (3)$$

By substitution from (1) and (2) may become:

$$\text{Duty cycle: Duty (100\%)}=100\times 1\ (R_F\times NUM+R_S)/V_{BAT} \quad (4)$$

If additional battery voltage sensing is now used, then the duty cycle may be re-calculated for that range by using a new $V_{BAT}$ value. See the example below for more details.

Example (1)

No PWM Control (Traditional Approach)

In this example, the operating battery voltage range is 18 to 32 volts; the desired wetting current $I_{WET}$=10 mA (minimum) at 18 volts; the number of switches active is NUM, the maximum number of switches active is 6.

To achieve 10 mA at 18 volts, we may require $R_S$=1800 Ohms.

At 18 volts, each resistor dissipates 180 mW. At 32 volts, each resistor dissipates 569 mW, and the wetting current is $I_{WET}$=17.8 mA.

TABLE (1)

Calculated values with no PWM at $V_{BAT}$ = 32 volts

| NUM switches | Wetting current (ea – mA) | Pwr in each $R_S$ (W) | Tot Current (A) | Tot Pwr (W) |
|---|---|---|---|---|
| 1 | 17.8 | 0.569 | 0.02 | 0.57 |
| 2 | 17.8 | 0.569 | 0.04 | 1.14 |
| 3 | 17.8 | 0.569 | 0.05 | 1.71 |
| 4 | 17.8 | 0.569 | 0.07 | 2.28 |
| 5 | 17.8 | 0.569 | 0.09 | 2.85 |
| 6 | 17.8 | 0.569 | 0.11 | 3.41 |

Example (2)

Using PWM Control, but no Battery Voltage Sensing

In this example, the operating battery voltage range is 18 to 32 volts; the desired wetting current $I_{WET}$=min. 10 mA at 18 volts; the filter includes a $R_F$=47 Ohm series resistor, with a 100 nF parallel capacitor; the pull-up resistors on each switch are $R_S$=680 Ohm; the number of switches active is NUM, and the maximum number of switches active is 6.

Therefore, using the above values, equation (4) becomes:

$$\text{Duty cycle: Duty (100\%)}=(47\times NUM+680)/V_{BAT}$$

TABLE (2)

Calculated values with PWM (no voltage sensing) at $V_{BAT}$ = 32 volts

| NUM switches | DUTY (100%) | Wetting current (ea – MA) | Pwr in $R_F$ (W) | Pwr in each $R_S$ (W) | Tot current (A) | Tot Pwr (W) |
|---|---|---|---|---|---|---|
| 1 | 40.4% | 17.78 | 0.01 | 0.21 | 0.02 | 0.23 |
| 2 | 43.0% | 17.78 | 0.06 | 0.21 | 0.04 | 0.49 |
| 3 | 45.6% | 17.78 | 0.13 | 0.21 | 0.05 | 0.78 |
| 4 | 48.2% | 17.78 | 0.24 | 0.21 | 0.07 | 1.10 |
| 5 | 50.8% | 17.78 | 0.37 | 0.21 | 0.09 | 1.45 |
| 6 | 53.4% | 17.78 | 0.53 | 0.21 | 0.11 | 1.82 |

Example (3)

Using PWM Control, Including Battery Voltage Sensing in Two Ranges

In this example, the operating battery voltage range is 18 to 32 volts:

Range 1=18 to 25V

Range 2=25 to 32V

The desired wetting current $I_{WET}$=10 mA at 18 volts; the R-C filter includes a $R_F$=47 Ohm series resistor, with a 100 nF parallel capacitor; the pull-up resistors on each switch are $R_S$=680 Ohm; the number of switches active is NUM, and the maximum number of switches active is 6.

For range 1, the wetting current is 10 mA at 18 volts.

TABLE (3)

Calculated values with PWM for Range 1, with $V_{BAT}$ = 25 volts

| NUM switches | DUTY (%) | Wetting current (ea – MA) | Pwr in $R_F$ (W) | Pwr in each $R_S$ (W) | Tot current (A) | Tot Pwr (A) |
|---|---|---|---|---|---|---|
| 1 | 40.4% | 13.89 | 0.01 | 0.13 | 0.01 | 0.14 |
| 2 | 43.0% | 13.89 | 0.04 | 0.13 | 0.03 | 0.30 |
| 3 | 45.6% | 13.89 | 0.08 | 0.13 | 0.04 | 0.48 |
| 4 | 48.2% | 13.89 | 0.15 | 0.13 | 0.06 | 0.67 |
| 5 | 50.8% | 13.89 | 0.23 | 0.13 | 0.07 | 0.88 |
| 6 | 53.4% | 13.89 | 0.33 | 0.13 | 0.08 | 1.11 |

For range 2 the wetting current is 10 mA at 25 volts.

TABLE (4)

Calculated values with PWM for Range 2, with $V_{BAT}$ = 32 volts

| NUM switches | DUTY (%) | Wetting current (ea – MA) | Pwr in $R_F$ (w) | Pwr in each $R_S$ (W) | Tot current (A) | Tot Pwr (A) |
|---|---|---|---|---|---|---|
| 1 | 29.1% | 12.80 | 0.01 | 0.11 | 0.01 | 0.12 |
| 2 | 31.0% | 12.80 | 0.03 | 0.11 | 0.03 | 0.25 |
| 3 | 32.8% | 12.80 | 0.07 | 0.11 | 0.04 | 0.40 |
| 4 | 34.7% | 12.80 | 0.12 | 0.11 | 0.05 | 0.57 |
| 5 | 36.6% | 12.80 | 0.19 | 0.11 | 0.06 | 0.75 |
| 6 | 38.5% | 12.80 | 0.28 | 0.11 | 0.08 | 0.95 |

Summary of the Calculations:

TABLE (5)

Summary

| Example | Maximum power in circuit (6 input switches) |
|---|---|
| 1. No PWM | 3.41 W |
| 2. PWM with EMI filter, and no battery sensing | 1.82 W |
| 3. PWM with EMI filter, and battery sensing in 2 ranges | 1.11 W |

As may be seen in Table 5, the power dissipated in the input circuit under worst case conditions may easily be reduced by half. There may also be substantial cost savings by using smaller resistors, and PCB (printed circuit board) savings as a result.

In summary, there may be three main desired effects of exemplary embodiments of the present invention:

1. Power: The power dissipated by series resistors $R_S$, may be reduced. Thus, less heat may generated, and the circuit board temperature may be reduced, which may lead to greater reliability of the electronics.
2. Size: Because less power may be dissipated, smaller sized resistors may be used. In addition, resistors in the voltage divider circuits may be dispensed with.
3. Cost: There may be cost savings because smaller resistors are used, some resistors may become unnecessary and may be eliminated, and also because less circuit board space may be required for placement and heat dissipation.

It may be understood by persons skilled in the art that alterations and modifications may be made to some features of the described exemplary embodiments of the present invention without departing from the spirit and scope of the present invention.

What is claimed is:

1. A method of providing a wetting current to at least one switch through a corresponding resistor element using a switch input circuit and a current source, the method comprising:

detecting a number of closed switches connected to the switch input circuit;

adjusting a pulse-width modulation signal in response to a detected number of closed switches; and modulating the wetting current as a function of the pulse-width modulation signal to reduce an average power consumption of the corresponding resistor element.

2. The method of claim 1, further comprising:

supplying the pulse-width modulation signal to a base of a transistor to allow periodically the wetting current to flow through an emitter and a collector of the transistor into the switch input circuit in accordance with a duty cycle of the pulse-width modulation signal.

3. The method of claim 2, further comprising:

increasing the duty cycle of the pulse-width modulation signal if the detected number of closed switches increases.

4. The method of claim 2, further comprising:

determining a voltage level of a voltage supply of the switch input circuit.

5. The method of claim 4, wherein the step of determining includes sensing the voltage level using an analog-to-digital converter to determine a digital value representative of the voltage level.

6. The method of claim 5, further comprising:

determining, from the digital value, which of a plurality of predetermined voltage ranges the voltage level falls within; and adjusting the duty cycle of the pulse-width modulation signal depending on a determined voltage range of the voltage supply.

7. A switch input circuit comprising:

at least one switch;

at least one resistor element;

a current source to provide a wetting current to the at least one switch through a corresponding resistor element of the at least one resistor element;

a modulation arrangement to modulate the wetting current to reduce an average power consumption of the corresponding resistor element, the modulation arrangement including a micro-controller configured to generate a pulse-width modulation signal;

a detection arrangement to detect a number of closed switches connected to the switch-input circuit; and an adjusting arrangement to adjust the pulse-width modulation signal in response to a detected number of closed switches.

8. The switch input circuit of claim 7, wherein the micro-controller is configured to generate the pulse-width modulation signal using feedback control.

9. The switch input circuit of claim 8, further comprising:

a transistor having a base, an emitter, and a collector, wherein the pulse-width modulation signal is supplied to the base to allow periodically a current to flow through the emitter and the collector into the switch input circuit in accordance with a duty cycle of the pulse-width modulation signal.

10. The switch input circuit of claim 7, wherein the detection arrangement is arranged in the micro-controller.

11. The switch input circuit of claim 7, wherein the micro-controller includes the adjusting arrangement.

12. The switch input circuit of claim 9, further comprising:

a voltage supply, wherein the micro-controller is adapted to determine a voltage level of the voltage supply.

13. The switch input circuit of claim 12, wherein the micro-controller is configured to sense a voltage level applied to a respective resistive element and subsequently calculate the voltage level of the voltage supply.

14. The switch input circuit of claim 13, wherein the micro-controller is adapted to determine within which of a plurality of preselected voltage ranges the voltage level of the voltage supply falls, and to adjust the duty cycle of the pulse-width modulation signal depending on a relevant voltage range of the voltage supply.

15. A switch input circuit comprising:

a current source to supply a wetting current to at least one switch; and a pulse-width modulation arrangement to provide a pulse-width modulation signal to modulate the wetting current to reduce an average wetting current supplied to the at least one switch to provide improved power consumption.

16. A method of improving power consumption characteristics of a switch input circuit, comprising:

providing a wetting current to at least one switch; and modulating the wetting current with a pulse-width modulation signal to reduce an average wetting current provided to the at least one switch.

17. A switch input circuit, comprising:

at least one switch;

at least one resistor element;

a voltage supply;

a current source to provide a wetting current to the at least one switch through a corresponding resistor element of the at least one resistor element;

a modulation arrangement to modulate the wetting current to reduce an average power consumption of the corresponding resistor element, the modulation arrangement including a micro-controller configured to determine a voltage level of the voltage supply and a voltage level of a respective resistive element, and to generate a pulse-width modulation signal;

a transistor having a base, an emitter, and a collector, wherein the pulse-width modulation signal is supplied to the base to allow periodically a current to flow through the emitter and the collector into the switch input circuit in accordance with a duty cycle of the pulse-width modulation signal;

a detection arrangement arranged in the micro-controller to detect a number of closed switches connected to the switch-input circuit; and an adjusting arrangement to adjust the pulse-width modulation signal in response to a detected number of closed switches.

18. A method of providing a wetting current to at least one switch through a corresponding resistor element using a switch input circuit and a current source, the method comprising:

detecting a number of closed switches connected to the switch input circuit;

adjusting a pulse-width modulation signal in response to a detected number of closed switches;

modulating the wetting current as a function of the pulse-width modulation signal to reduce an average power consumption of the corresponding resistor element;

supplying the pulse-width modulation signal to a base of a transistor to allow periodically the wetting current to flow through an emitter and a collector of the transistor into the switch input circuit in accordance with a duty cycle of the pulse-width modulation signal;

increasing the duty cycle of the pulse-width modulation signal if the sensed number of closed switches increases;

determining a voltage level of a voltage supply of the switch input circuit;

sensing the voltage level using an analog-to-digital converter to determine a digital value representative of the voltage level;

determining, from the digital value, which of a plurality of predetermined voltage ranges the voltage level of the voltage supply falls within; and adjusting the duty cycle of the pulse-width modulation signal depending on a determined voltage range of the voltage supply.

* * * * *